United States Patent
Mohan et al.

(10) Patent No.: US 10,906,397 B2
(45) Date of Patent: Feb. 2, 2021

(54) METHODS AND SYSTEMS FOR CRUISE CONTROL

(71) Applicant: Ford Global Technologies, LLC, Dearborn, MI (US)

(72) Inventors: Shankar Mohan, Ann Arbor, MI (US); Christopher Short, Ann Arbor, MI (US); Yan Wang, Ann Arbor, MI (US); John Michelini, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 462 days.

(21) Appl. No.: 15/863,728

(22) Filed: Jan. 5, 2018

(65) Prior Publication Data
US 2019/0210460 A1     Jul. 11, 2019

(51) Int. Cl.
*B60W 30/14* (2006.01)
*B60K 31/00* (2006.01)
*B60W 50/00* (2006.01)

(52) U.S. Cl.
CPC ......... *B60K 31/00* (2013.01); *B60W 50/0097* (2013.01); *B60W 2510/0619* (2013.01); *B60W 2510/0628* (2013.01); *B60W 2520/12* (2013.01); *B60W 2530/14* (2013.01); *B60W 2710/0644* (2013.01); *B60W 2720/30* (2013.01); *B60Y 2200/92* (2013.01); *Y10S 903/903* (2013.01)

(58) Field of Classification Search
CPC ... B60K 31/00; B60K 6/448; B60W 50/0097; B60W 2510/0619; B60W 2510/0628; B60W 2520/12; B60W 2530/14; B60W 2710/0644; B60W 2720/30; B60W 2050/0025; B60W 30/143; B60W 30/14; B60W 10/06; B60W 2520/10; B60W 2520/30; B60W 2530/10; B60Y 2200/92; Y10S 903/903
See application file for complete search history.

(56) References Cited

U.S. PATENT DOCUMENTS

| | | | |
|---|---|---|---|
| 8,775,006 B2 | 7/2014 | Moshchuk et al. | |
| 2005/0273261 A1* | 12/2005 | Niwa | B62D 15/029 701/301 |
| 2010/0023236 A1* | 1/2010 | Morgan | B60W 30/14 701/71 |
| 2014/0350820 A1* | 11/2014 | Johansson | B60W 50/0097 701/93 |

(Continued)

OTHER PUBLICATIONS

Zhao, R. et al., "Real-Time Weighted Multi-Objective Model Predictive Controller for Adaptive Cruise Control Systems," International Journal of Automotive Technology, vol. 18, No. 2, Apr. 2017, Available Online Jan. 12, 2017, 14 pages.

*Primary Examiner* — Masud Ahmed
(74) *Attorney, Agent, or Firm* — Geoffrey Brumbaugh; McCoy Russell LLP (57) ABSTRACT

Methods and systems are provided for controlling vehicle torque output during cruise control. In one example, a method may include determining future vehicle torque output by minimizing an objective function based on an instantaneous vehicle speed, an average vehicle speed, and a present vehicle torque output. The weights of the objective function may be updated based on the past and the present vehicle operating parameters.

15 Claims, 5 Drawing Sheets

(56) References Cited

U.S. PATENT DOCUMENTS

| | | | |
|---|---|---|---|
| 2015/0203117 A1* | 7/2015 | Kelly | B60K 31/02 |
| | | | 701/91 |
| 2016/0108732 A1 | 4/2016 | Huang et al. | |
| 2016/0297435 A1* | 10/2016 | D'Amato | B60W 50/0097 |
| 2017/0039855 A1* | 2/2017 | Maeda | B60W 30/09 |
| 2017/0167347 A1* | 6/2017 | Sun | F01N 3/2066 |
| 2017/0356350 A1* | 12/2017 | Li | F02D 11/02 |
| 2019/0039591 A1* | 2/2019 | Raveendran | B60W 10/06 |

* cited by examiner

METHODS AND SYSTEMS FOR CRUISE CONTROL

FIELD

The present description relates generally to methods and systems for controlling a vehicle torque output for energy efficient cruise control.

BACKGROUND/SUMMARY

Optimization problem aims to minimize or maximize an objective function by compromising among conflict objectives. The objective function may be a sum of weighted objectives. For example, during cruise control, a vehicle torque output may be optimized to increase fuel economy while at the same time maintain a vehicle speed at a requested speed level. The objective of increasing fuel economy may conflict with the objective of speed control, as maintaining a certain vehicle speed may be negatively correlated with fuel consumption. The objective function for optimizing the cruise control may be formulated to be the weighted sum of the objective of fuel control and the objective of speed control.

The optimal control action for the optimization problem may be generated through model predictive control (MPC)—also known as receding horizon controller. The MPC may be used in various vehicle control problems that require optimization. For example, the MPC may be used in deciding the optimal power-split, in route planning, and in maneuvering self-driven vehicles. In deriving the control action, the controller predicts the behavior of the system over a period into the future responsive to a sequence of actions that could be applied, and computes the associated reward and penalty accrued over the future period. By comparing the rewards and the penalties attributed to all sequences of trajectories, one that either maximizes reward or minimizes penalty may be selected, and the first element of the selected sequence is applied to the system as the optimal decision. This process is repeated responsive to receiving each measurement of system response. Such control framework can take advantage of preview information that will be available from the vehicle to vehicle (V2V) and vehicle to infrastructure (V2I) technologies in the future.

Other attempts for optimizing vehicle control with MPC including controlling engine air flow with MPC. One example approach is shown by Huang et al. in U.S. 2016/0108732. Therein, Explicit MPCs and gains are calibrated offline at various operating conditions. The optimal control strategy is obtained online using the calibrated Explicit MPCs and gain scheduling matrices responsive to the vehicle operating condition.

However, the inventors herein have recognized potential issues with such systems. As one example, since the weights of the Explicit MPCs are calibrated offline for a specific range of the operating parameter, it may not be able to provide optimal control at each level of the operating parameter within the range. Further, the controller output may change abruptly when switching between two calibrated Explicit MPCs responsive to the change in the operating condition. Moreover, when generating the optimal control, the conventional MPC may formulate each objective of the objective function by limiting the objectives locally, but does not consider system performance with respect to a global objective. For example, in the cruise control problem, the objective of maintaining vehicle speed at the requested speed level may be formulated to only limit the deviation of an instantaneous vehicle speed and the fuel consumption. As a result, the MPC does not have information about the history of the vehicle speed, and may fail to keep the average vehicle speed close to the requested speed. The MPC may also fail to satisfy the recursive feasibility, which requires the future vehicle speed being constrained in a permissive range regardless of the future road grades.

In one example, the issues described above may be addressed by a method comprising determining a future wheel torque by minimizing an objective function including each and every of a deviation of the instantaneous vehicle speed form a requested vehicle speed, a deviation of the average vehicle speed from the requested vehicle speed, and a fuel consumption. In this way, the objective function of the MPC may include the history of vehicle performance, and generate optimal control not only limiting the instantaneous speed deviation, but also keeping the overall average speed of the vehicle close to a requested level.

As one example, an objective function of an optimization problem may include a deviation of the instantaneous vehicle speed from a requested vehicle speed, a deviation of the average vehicle speed from the requested vehicle speed, and a fuel consumption. The objective function may further include a first weight for the deviation of the average vehicle speed from the requested vehicle speed, a second weight for the deviation of the instantaneous vehicle speed form the requested vehicle speed, and a third weight for the fuel consumption. An optimal future wheel torque that can minimize both speed deviation and the fuel consumption may be generated by minimizing the objective function. During vehicle operation, weights of the optimization may be updated responsive to the past and present vehicle operating parameters. As one example, the weight for the fuel consumption is updated based on the average vehicle speed. As another example, the weight for the fuel consumption is updated based on the past and present vehicle mass. By including the average speed in the objective function, the MPC may simultaneously maintain the instantaneous vehicle speed and the average vehicle speed to the requested vehicle speed. By updating the weights of the objective function during vehicle operation, the objective function may generate the optimal control decision responsive to change in the operating parameters, as the objective function is tailored to each specific level of the operating parameter. Therefore, energy efficient cruise control may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
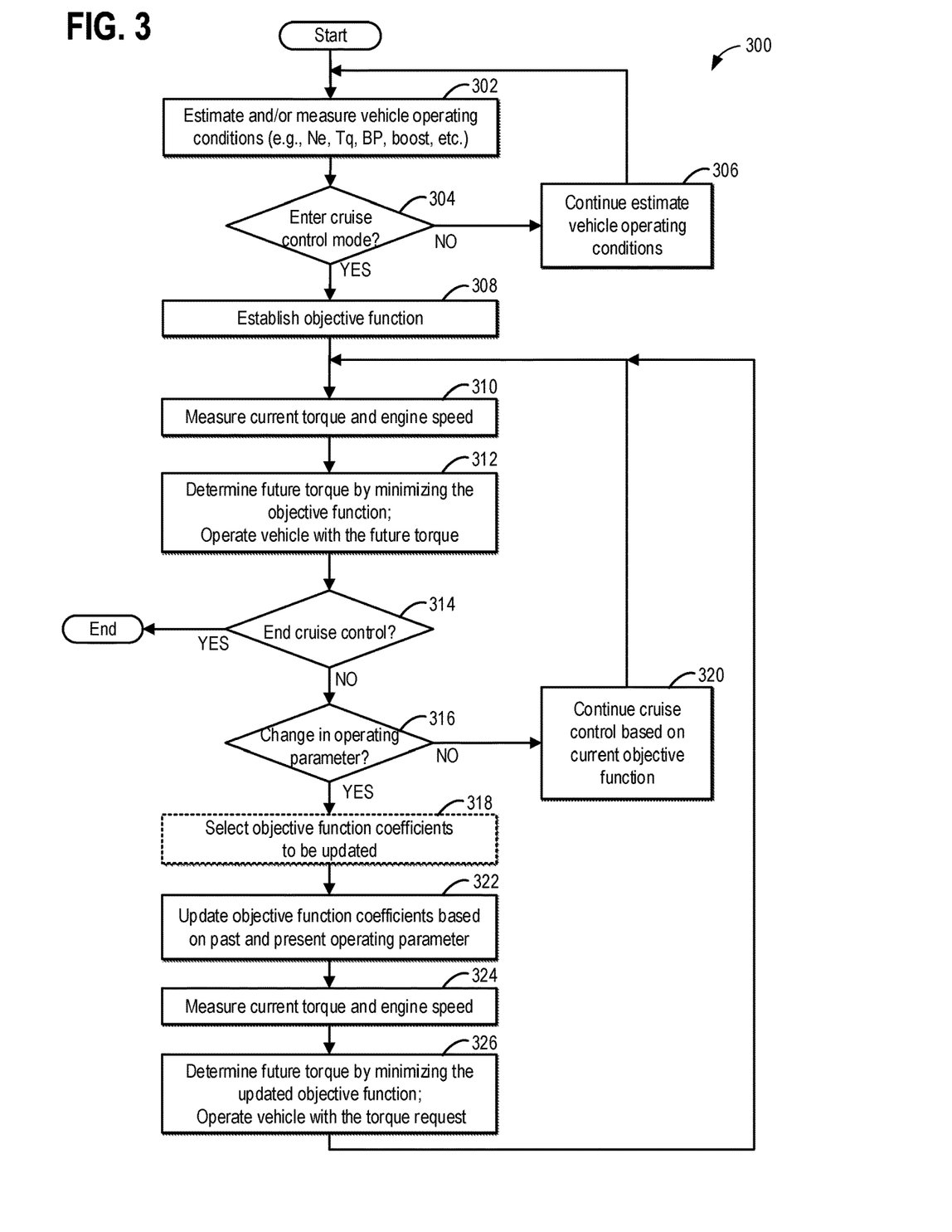
FIG. 3 shows an example method of cruise control with energy efficient MPC.
Figure 4:
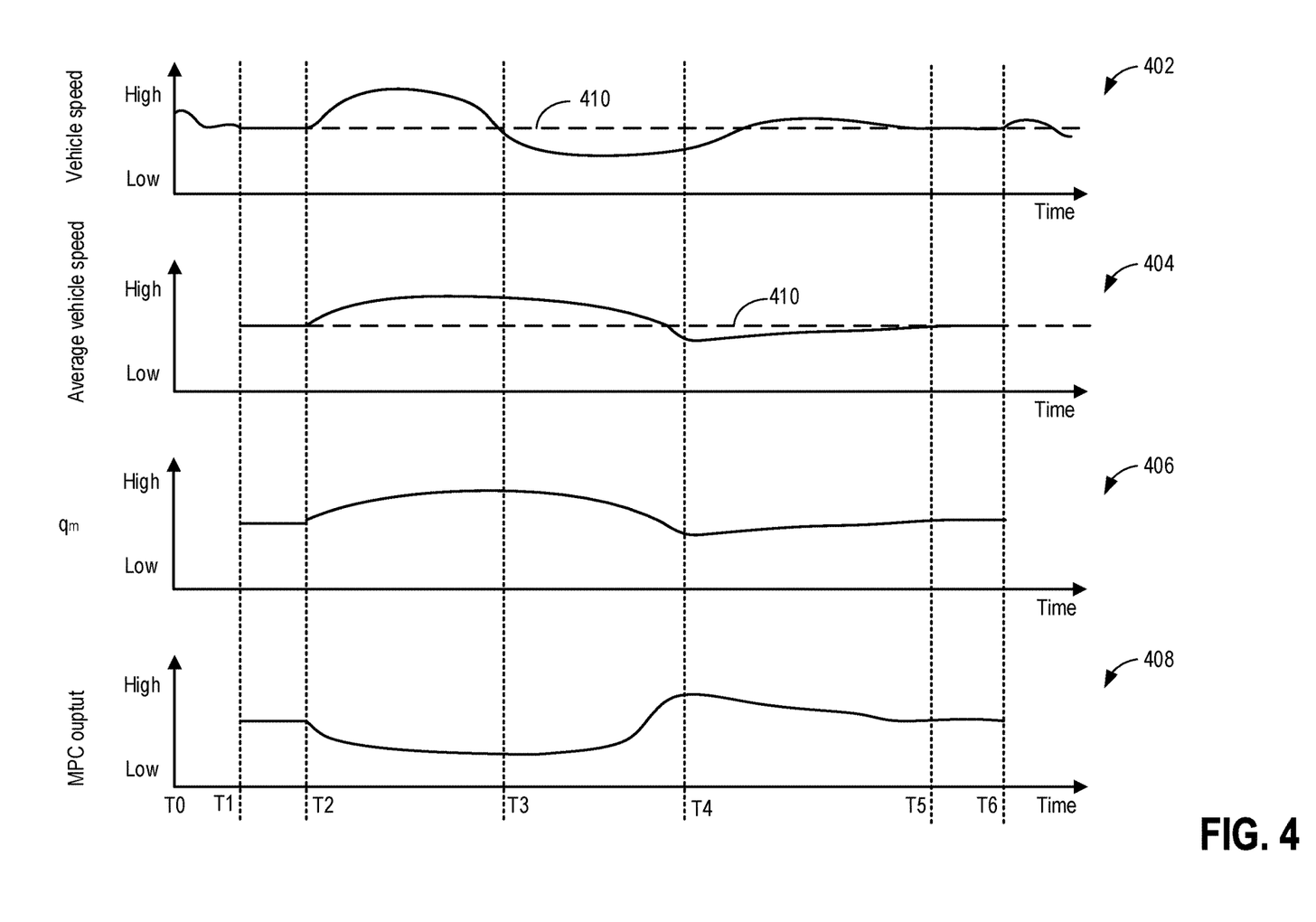
FIG. 4 shows an example timeline of parameter variation during MPC control, wherein the objective function is updated based on an average vehicle speed.
Figure 5:
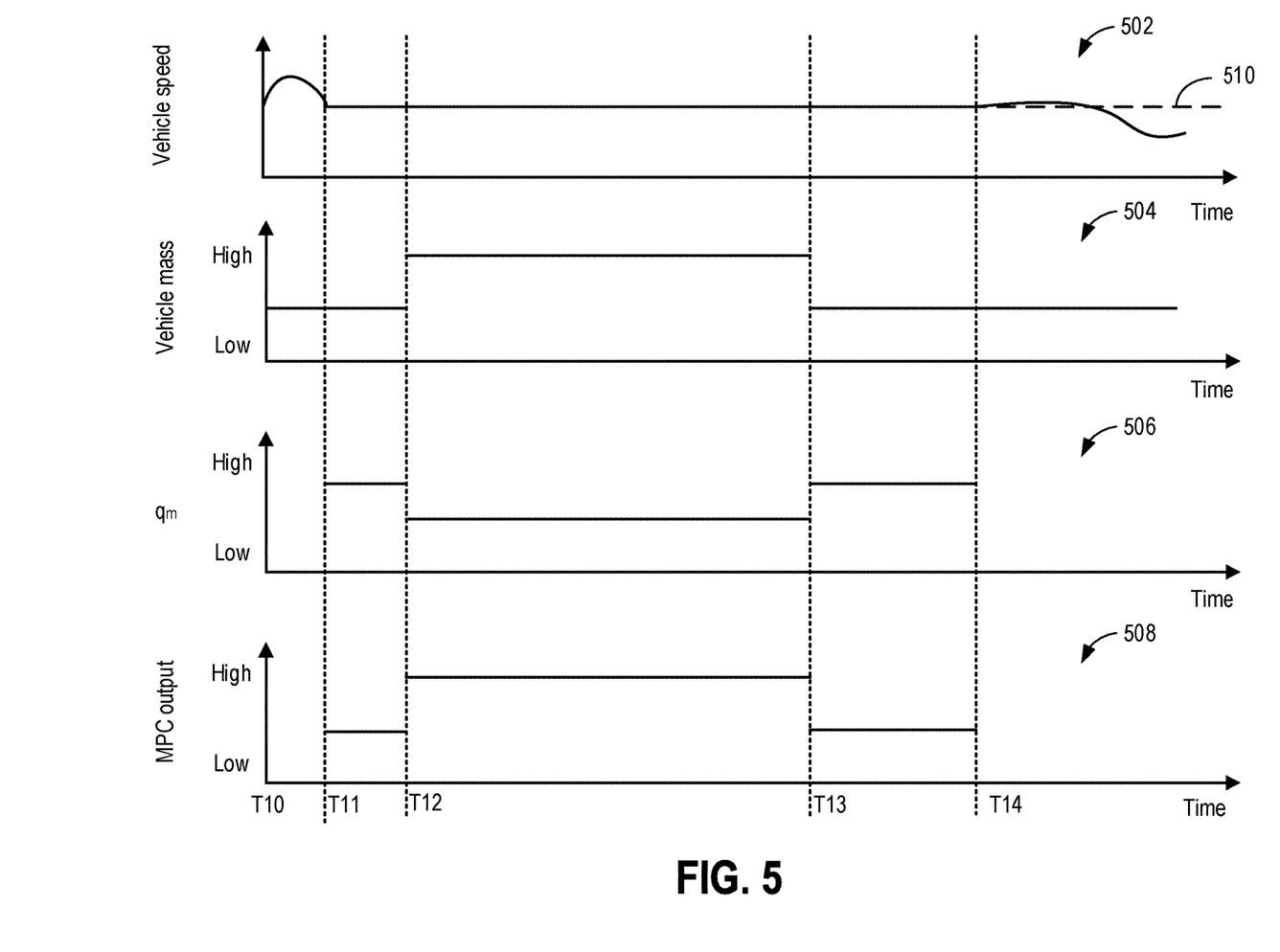
FIG. 5 shows an example timeline of parameter variation during MPC control, wherein the objective function is updated based on a vehicle mass.

The following description relates to systems and methods for cruise control of a vehicle with an energy efficient MPC. An example propulsion system and engine system of the vehicle are introduced in FIG. 1 and FIG. 2. FIG. 3 is a flow chart of an example method for cruise control. In particular, during the cruise control mode, optimized future wheel torque is determined based on an objective function. The objective function may include three objectives including the deviation of the instantaneous vehicle speed, the deviation of the average vehicle speed, and the fuel consumption. The optimal control output, or the optimized future wheel torque, may be determined by minimizing the objective function subjective to the constraints. The method also includes updating the coefficients of the objective function based on the past and present vehicle operating parameters. The past and present vehicle operating parameters may include an average vehicle speed and a vehicle mass. FIG. 4 is a timeline showing variation of parameters while updating the objective function based on the average vehicle speed. FIG. 5 is a timeline showing variation of parameters while updating the objective function based on the vehicle mass.

Figure 1:
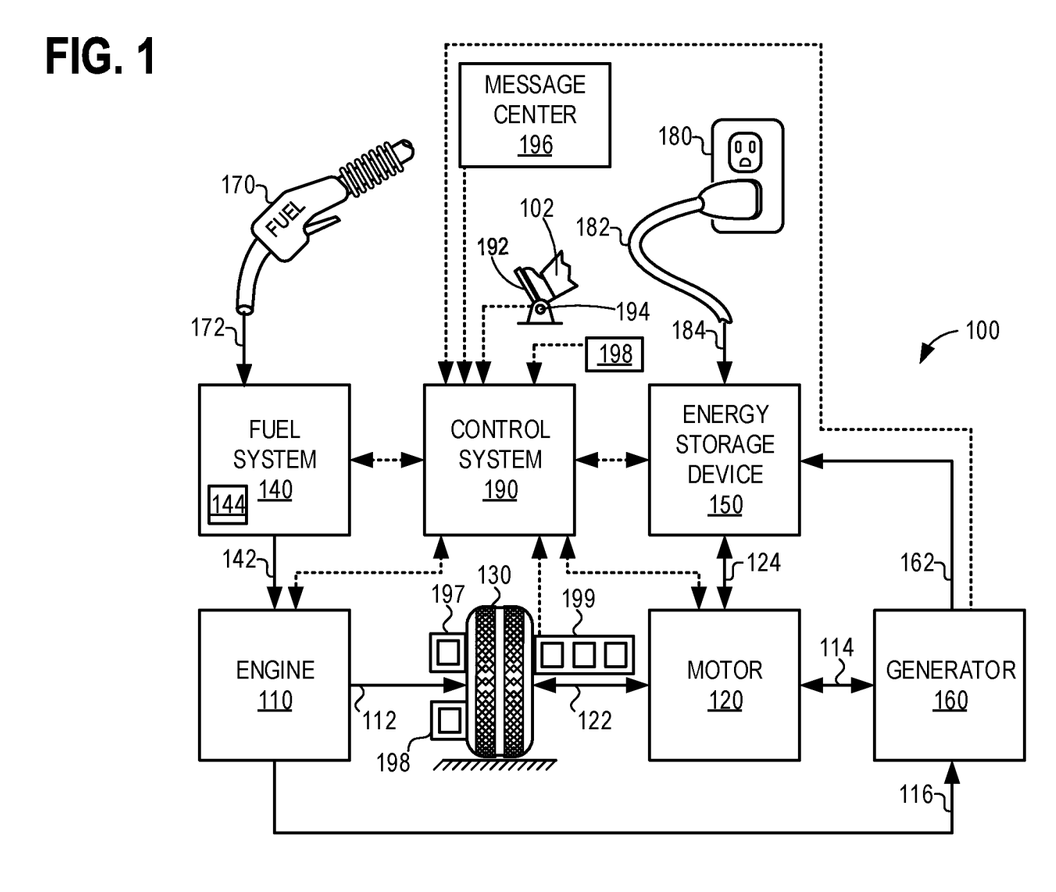
FIG. 1 shows a schematic of an example propulsion system for a vehicle.

Turning now to FIG. 1, it illustrates an example of a vehicle propulsion system 100. Vehicle propulsion system 100 may comprise a fuel burning engine 110 and a motor 120. As a non-limiting example, engine 110 comprises an internal combustion engine and motor 120 comprises an electric motor. As such, vehicle propulsion system 100 may be a propulsion system for a hybrid-electric vehicle. However, vehicle propulsion system may also be a propulsion system for a non-hybrid vehicle, or an electric vehicle with an electric motor and no combustion engine. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). In other examples, where the vehicle propulsion system 100 is for an electric vehicle, vehicle propulsion system may be referred to as an electric vehicle (EV).

Vehicle propulsion system 100 may utilize a variety of different operational modes depending on operating conditions encountered by the vehicle propulsion system. Some of these modes may enable engine 110 to be maintained in an off state (e.g. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The vehicle propulsion system may be configured to transition between two or more of the operating modes described above depending on vehicle operating conditions. As another example, vehicle propulsion system may be a propulsion system for an electric vehicle (e.g., with no combustion engine), wherein an electric motor receiving electric power from energy storage device 150 (e.g., a battery) may propel the vehicle.

Fuel system 140 may include one or more fuel storage tanks 144 for storing fuel on-board the vehicle. For example, fuel tank 144 may store one or more liquid fuels, including but not limited to gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, an exhaust-gas grid heater, an exhaust-gas recycle cooler, etc. As a non-limiting example, energy storage device 150 may include one or more batteries and/or capacitors.

Control system 190 may communicate with one or more of engine 110, motor 120, fuel system 140, energy storage device 150, and generator 160. As will be described in FIG. 2, control system 190 may comprise controller 211 and may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. As a further non-limiting example, vehicle propulsion system 100 may be configured as a plug-in electric vehicle (EV), whereby electrical energy may be supplied to energy storage device 150 from power source 180 via an electrical energy transmission cable 182. Control system 190 may further control the output of energy or power from energy storage device 150 (e.g., a battery) depending on the electric load of vehicle propulsion system 100. For example, during reduced electrical load operation, control system 190 may step-down the voltage delivered from energy storage device 150, via a an inverter/converter, in order to save energy.

During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (state-of-charge).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion.

A plug-in hybrid electric vehicle, as described with reference to vehicle propulsion system 100, may be configured to utilize a secondary form of energy (e.g. electrical energy) that is periodically received from an energy source that is not otherwise part of the vehicle.

The vehicle propulsion system 100 may also include ambient temperature/humidity sensor, electrical load sensor, and a roll stability control sensor, such as a lateral and/or longitudinal and/or steering wheel position or yaw rate sensor(s) 199. A wheel torque sensor 197 may be mechanically coupled to the drive wheel 130 for measuring the instantaneous wheel torque. A speed sensor 198 may be coupled to the drive wheel 130 for measuring the instantaneous vehicle speed. Wheel torque also may be derived from engine torque, transmission gearing, and operation of a torque converter. Engine torque in turn may be derived from the mass of air flowing into the engine cylinders in the case of a gasoline engine combusting a stoichiometric mixture of air and fuel. In the case of a diesel engine, engine torque is related to the amount of fuel delivered to the engine cylinders. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, GPS device, etc. In an alternative embodiment, the message center may communicate audio messages to the operator without display. Further, the sensor(s) 199 may include a vertical accelerometer to indicate road roughness and a lateral accelerometer. These devices may be connected to control system 190. In one example, the control system may adjust engine output and/or the wheel brakes to increase vehicle stability in response to sensor(s) 199.

Figure 2:
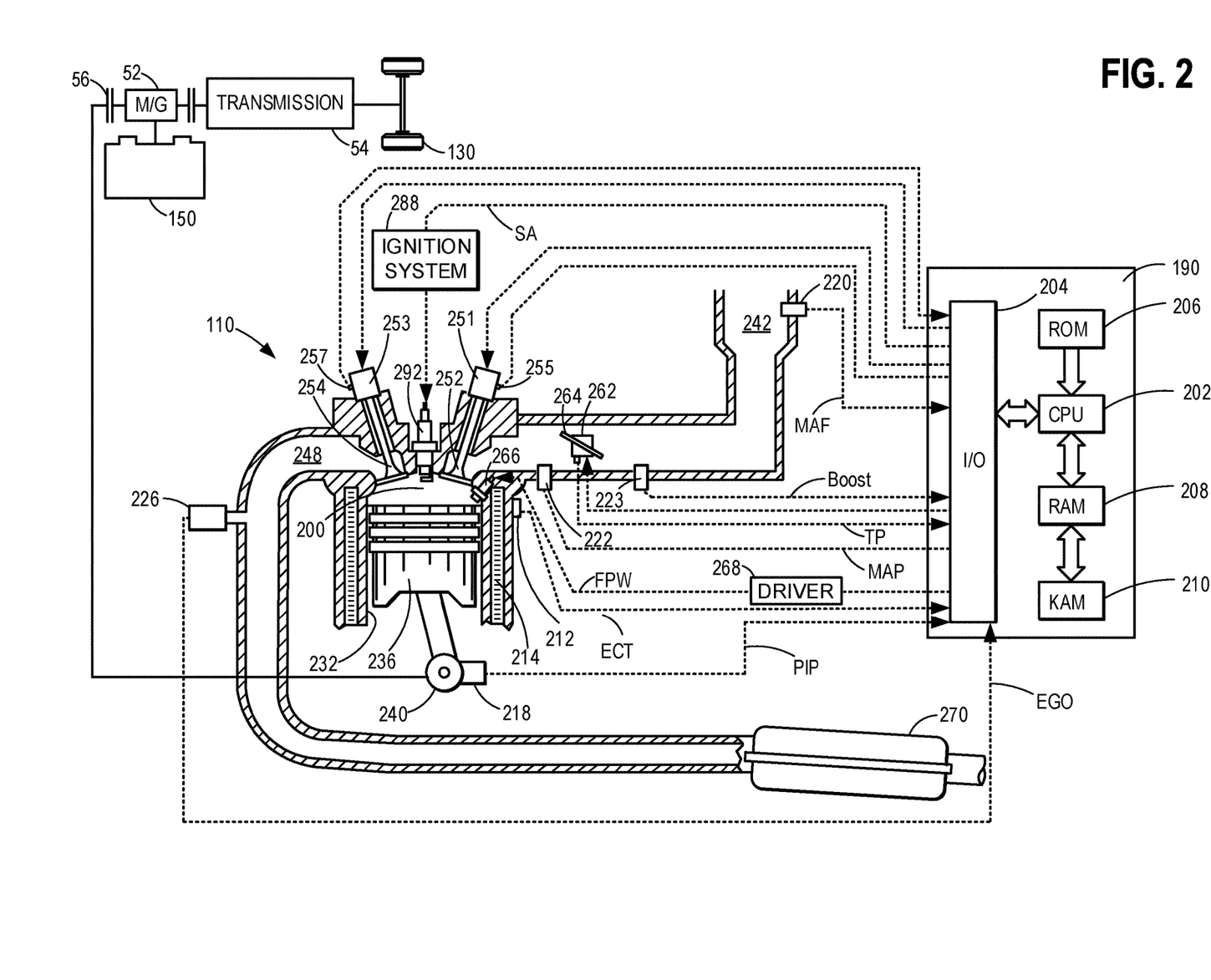
FIG. 2 shows a schematic of an example engine included in the propulsion system of FIG. 1.

Referring now to FIG. 2, it illustrates a non-limiting example of a cylinder 200 of engine 110, including the intake and exhaust system components that interface with the cylinder. Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with drive wheel 130, electric machine 52 via a transmission.

Cylinder 200 may receive intake air via an intake passage 242. Intake passage 242 may also communicate with other cylinders of engine 110. Intake passage 242 may include a throttle 262 including a throttle plate 264 that may be adjusted by control system 190 to vary the flow of intake air that is provided to the engine cylinders. Cylinder 200 can communicate with intake passage 242 via one or more intake valves 252. Cylinder 200 may exhaust products of combustion via exhaust valve 254 and exhaust passage 248. Cylinder 200 can communicate with exhaust passage 248 via one or more exhaust valves 254. Exhaust gas sensor 226 may be coupled to the exhaust passage for measuring the composition of the exhaust gas. Exhaust gas treatment device 270 may be coupled to the exhaust passage downstream of the exhaust gas sensor 226 for processing the exhaust gas before releasing it outside of the vehicle.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

The electric machine 52 may include motor or a motor/generator. Crankshaft 140 of engine 10 and electric machine 52 are connected via a transmission 54 to vehicle wheels 130 when one or more clutches 56 are engaged. In the depicted example, a first clutch 56 is provided between crankshaft 140 and electric machine 52, and a second clutch 56 is provided between electric machine 52 and transmission 54. Controller 190 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

A non-limiting example of control system 190 is depicted schematically in FIG. 2. Control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 can communicate with various sensors and actuators of engine 110, energy storage device 150, and fuel system 140 via an input/output device 204. As a non-limiting example, these sensors may provide sensory feedback in the form of operating condition information to the control system, and may include: an indication of mass airflow (MAF) through intake passage 242 via sensor 220, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content via exhaust gas sensor 226, an indication of intake valve position via sensor 255, an indication of exhaust valve position via sensor 257, and an indication of boost pressure from pressure sensor 223.

The controller 190 receives signals from the various sensors of FIGS. 1-2 and employs the various actuators of FIGS. 1-2 to adjust engine operation based on the received signals and instructions stored on a memory of the controller. For example, adjusting fuel injection timing may include adjusting the driver 268 to adjust the amount of fuel injected into the cylinder. Adjusting the amount of air charge in the cylinder may include adjusting the throttle by varying the position of the throttle plate, and the intake valve timing by actuating the intake valve actuator 251.

Turning to FIG. 3, an example method 300 for cruise control using MPC is presented. In particular, an objective function for the MPC may include the objective to minimize the deviation of the average vehicle speed from the requested vehicle speed, the objective to minimize the deviation of the instantaneous vehicle speed from the requested vehicle speed, and the objective for reducing the fuel consumption. Each of the objectives is independently weighted. Increasing the weight may penalize the corresponding objective more, that is, to apply stricter limitation on the corresponding objective. One or more weights of the objectives may be updated based on the past and present vehicle operating parameter while operating the vehicle. As such, the MPC is adapted online responsive to change in operating parameter. Further, by updating the MPC based on the past and present vehicle operating parameter, global objectives such as minimizing the deviation of the overall averaged vehicle speed from the requested speed, and/or minimizing the overall fuel economy, may be achieved.

Instructions for carrying out method 300 and the rest of the methods included herein may be executed by a controller based on instructions stored on a non-transient memory of the controller and in conjunction with signals received from sensors of the engine system, such as the sensors described above with reference to FIG. 1 and FIG. 2. The controller may employ engine actuators of the engine system to adjust engine operation, according to the methods described below.

At 302, vehicle operating conditions are estimated and/or measured by a controller (such as controller 190 of FIG. 2). The controller acquires measurements from various sensors in the engine system and estimates operating conditions including engine torque output, engine speed, vehicle speed, atmospheric pressure, ambient temperature, boost pressure, and engine load.

At 304, method 300 may determine whether to enter the cruise control mode. As one example, the vehicle may enter the cruise control mode upon receiving a request from a vehicle operator. As another example, the vehicle may enter the cruise control mode responsive to a signal from the controller. The controller may generate the signal based on engine operating condition estimated at 302. The controller may generate the signal further based on information external from the vehicle, such as vehicle route, road grade, and weather condition.

During the cruise control mode, the vehicle speed is set to a requested vehicle speed. The requested vehicle speed may be set by the vehicle operator. The requested vehicle speed may alternatively be set by the controller based on the external information including the speed limit, vehicle route, road grade, and weather condition. The controller may obtain the external information from GPS system, broadcast, or sensors positioned on the vehicle. The vehicle may exit the cruise control mode responsive to an action of the operator, such as braking. The vehicle may also exit the cruise control mode responsive to an exit request generated from the controller. If it is determined to enter the cruise control mode, method 300 moves to 308. Otherwise, method 300 moves to 306 to continue estimate or measure vehicle operating conditions.

At 308, the MPC problem is initialized by establishing the objective function. As one example, the optimal control problem in the receding horizon framework involves solving an optimization problem at each time instant. A sequence of control actions are solved by minimizing an objective function over a time period of a prediction horizon. The first control action in the sequence is selected as the optimal control action at the time instant. As one example, the objective function may be in the form of:

$$J = q_{\bar{v}}\left(\frac{1}{N}\sum_{i=k+1}^{k+N} v_i - v_{sp}\right)^2 + \\ q_v \sum_{i=k+1}^{k+N} (v_i - v_{sp})^2 + q_m \sum_{i=k}^{k+N-1} m_f(T_i, w_i)$$

Equation 1 wherein T is vehicle wheel torque, v is vehicle speed, $v_{sp}$ is the requested vehicle speed, $m_f$ is a function that calculates the instantaneous fuel consumption based on the torque output and the engine speed w. The objective function sums up three objectives: the deviation of the average vehicle speed from the requested vehicle speed, the deviation of the instantaneous vehicle speed from the requested vehicle speed, and the fuel consumption. Each of the objectives is weighted by a weight: the deviation of the average vehicle speed from the requested vehicle speed is weighted by $q_{\bar{v}}$; the deviation of the instantaneous vehicle speed from the requested vehicle speed is weighed by $q_v$, and the fuel consumption is weighted by $q_m$. The weight of the objective function rewards or penalizes corresponding objective. For example, increasing $q_v$ penalizes the deviation of the instantaneous vehicle speed from the requested speed. In other words, the deviation of the instantaneous vehicle speed from the requested vehicle speed is further limited with increased $q_v$. At the same time, the fuel consumption may be less penalized with increased $q_v$. The objective function evaluates the three objectives over a prediction horizon from current time instant k to future time instant k+N, and i is a time instant within the prediction horizon. As such, $v_i$ indicates instantaneous vehicle speed, $T_i$ indicates instantaneous torque output, $\omega_i$ indicates instantaneous engine speed.

In another embodiment, the objective function for a hybrid vehicle may be in the form of:

$$J = q_{\bar{v}}\left(\frac{1}{N}\sum_{i=k+1}^{k+N} v_i - v_{sp}\right)^2 + q_v \sum_{i=k+1}^{k+N} (v_i - v_{sp})^2 + \sum_{i=k}^{k+N-1} q_m m_f(T_i, w_i) + q_z(z_i - z_{ref})^2 + q_Z(z_{k+N} - z_{ref})^2, \quad \text{Equation 2}$$

wherein z is the state of charge of the battery, $z_{ref}$ is the nominal expected state of charge; $q_z$ and $q_Z$ are relative weight factors.

The objective functions of Equations 1 and 2 are subject to the following constrains:

$$v_{i+1}=f^+(i,v_i,T_i,\eta_i, \quad \text{Equation 3}$$

$$w_{i+1}=g^+(i,w_i,T_i,\eta_i, \quad \text{Equation 4}$$

$$v_i \in [v_{min}, v_{max}], \quad \text{Equation 5}$$

$$T_i \in [T_{min}, T_{max}], \quad \text{Equation 6}$$

$$|T_{i+1}-T_i| \leq T_{rate}^{max}, \quad \text{Equation 7}$$

wherein $f^+(\cdot)$ and $g^+(\cdot)$ are functions for vehicle speed and engine speed; $\eta$ is the disturbance. The instantaneous vehicle speed $v_i$ is bounded by the maximum vehicle speed $v_{max}$ and the minimum vehicle speed $v_{min}$. The instantaneous wheel torque $T_i$ is bounded by the maximum wheel torque $T_{max}$ and the minimum wheel torque $T_{min}$. Further, the change of the wheel torque between consecutive time instants is limited by the wheel torque maximum change rate $T_{rate}^{max}$ It is assumed that the disturbance $\eta$ over the prediction horizon (k to k+N) is known. For example, the disturbance may be known from external sources such as GPS data. Since the disturbance is known over the prediction horizon, it is no longer considered as a disturbance in the vehicle operation dynamics.

Method 300 may also initialize coefficients of the objective function at 308. The coefficients may include the weights of the objectives. The coefficients may also include coefficients of function $m_f$. In one embodiment, the weights of the objective function (such as $q_{\bar{v}}$, $q_v$, and $q_m$) may be initialized by design of experiment (DOE). For example, various noises and design factors may be tested and the optimal weights may be determined through regression or inspection.

At 310, method 300 measures current wheel torque $T_k$ and current engine speed $\omega_k$. In one example, the current wheel torque and current engine speed may be measured by corresponding sensors. The measured current wheel torque and engine speed are instantaneous wheel torque and instantaneous engine speed at the present time instant k.

At 312, method 300 determines the future torque by minimizing the objective function established at 308. Specifically, based on the measured current wheel torque and current the engine speed at 310, the objective function J of Equation 1 or 2 is minimized subjective to the constraints of Equations 3-7. As one example, the objective function may be minimized to generate an optimal sequence of wheel torque T in the prediction horizon. The first element (i.e. future wheel torque at the k+1 time instant) may be selected as the future torque and output from the MPC. The vehicle is then operated to generate the future torque. For example, the determined future torque may be converted to an air-fuel ratio signal and sent to the fuel injector and various engine valves. The controller may also calculate requested engine speed based on the future torque, and controlling engine ignition based on the engine speed via the ignition system.

At 314, method 300 determines whether the cruise control mode ends. The cruise control mode may be ended by the vehicle operator. The cruise control mode may alternatively be ended by the controller responsive to external or internal vehicle operating conditions. If the cruise control mode ends, method 300 ends. Otherwise, method 300 proceeds to 318.

At 316, method 300 determines whether there is change in the operating parameter. The operating parameter may include average vehicle speed and/or vehicle mass. Method 300 may determine that there is change in the operating parameter responsive to the change in the level of the operating parameter, or the amount of change in the operating parameter exceeding a predetermined range.

In one embodiment, method 300 determines the average vehicle speed by taking a time average of the measured vehicle speed starting from the beginning of the cruise control.

In one embodiment, method 300 determines whether there is change in vehicle mass. The vehicle mass may be estimated based on wheel torque T, vehicle speed v, and road grade $\phi$. For example, the vehicle dynamics may be presented by $$v = \beta_1 T + \beta_2 v^2 + \beta_3 \phi + \beta_4, \quad \text{Equation 8}$$

wherein $\beta_*$ are coefficients. The coefficients may be adapted in real-time based on sensor information including the instantaneous wheel torque, vehicle speed, and road grade. The adaptation may include a linear least-squares-estimator and/or a recursive estimation strategy. Vehicle mass m may then be derived from coefficient $\beta_1$, as the vehicle mass is in linear relationship with $\beta_1$:

$$m \propto \frac{1}{\beta_1}. \quad \text{Equation 9}$$

The vehicle mass may be estimated using a linear estimator. The two estimators—the one that estimates $\beta_1$, and the other that estimates the vehicle mass have to be tuned in a manner that the estimator of vehicle mass is filtered and is not impacted by transients in system behavior.

Responsive to change in the operating parameter, method 300 may proceed to 318 to select one or more coefficients of the objective function to be updated. Alternatively, method 300 may proceed to 322 to update predetermined coefficients of the objective function. If no change is detected, method 300 moves on to 320 to continue the cruise control based on the current objective function.

At 318, method 300 may optionally select one or more coefficients of the objective function to be updated online in real-time. The objective function coefficients may include the weights of the objectives (such as $q_{\bar{v}}$, $q_v$, and $q_m$ in Equations 1 and 2). The objective function coefficients may further include coefficients of the function for calculating the instantaneous fuel consumption (such as parameters of function $m_f(\cdot)$ in Equations 1 and 2). The objective function coefficients may be updated by evaluating the impact of the change in the objective function coefficient on the global objective. In one example, the impact may be evaluated by estimating the sensitivity of a value function with respect to the objective function coefficient. Consider the following value function V:

$$V(x_0, \theta_1, \ldots, \theta_m) = \quad \text{Equation 10}$$

$$\left\{ \int_0^{t_f} \phi(t, x, u, \theta_1, \ldots, \theta_m) dt | x:[0, t_f] \stackrel{\dot{x}=f(t,x,u)\,a.e.}{\rightarrow} X, \right.$$

$$\left. x(0) = x_0, u:[0, t_f] \rightarrow U \right\},$$

wherein $\theta_1, \ldots, \theta_m$ are coefficients of the objective function, $\phi(\cdot)$ is a representation of the instantaneous cost associated with the control and state trajectory, $t_f$ is the terminal time of the optimal control problem, and x is the state representation of the system. The sensitivity of the value function to the coefficient $\theta_i$ may be calculated by the partial derivative of the value function to the coefficient $\theta_i$, that is $$\frac{\partial V}{\partial \theta_i}.$$

The sensitivity measures the perturbation of individual objective function coefficient to the cost objective function. The coefficient with the highest sensitivity may be selected to be updated online.

In one embodiment, different coefficients of the objective function may be updated responsive to the change in different operating parameters. In another embodiment, different operating parameters may be selected based on the operating condition of the vehicle. For example, one coefficient may be updated responsive to the change of the average vehicle speed, and a different coefficient may be updated responsive to the change of vehicle weight.

At 322, method 300 updates the objective function coefficients based on past and present operating parameter. In one embodiment, the objective function coefficients may be the one or more coefficients selected at 318 based on sensitivity of the coefficients to the objective function. In another embodiment, the objective function coefficients to be updated may be predetermined. In yet another embodiment, the objective function coefficient to be updated may be determined based one the change in operating parameter. The past and present operating parameter may include the average vehicle speed and the vehicle mass. The past and present operating parameter may be the operating parameter changed at 316.

In one embodiment, the weight for fuel consumption (such as $q_m$ in Equations 1 and 2) may be updated responsive to the change in the average vehicle speed calculated at 316. The weight for fuel consumption may increase responsive to increased average vehicle speed, and decrease responsive to decreased average vehicle speed. The weight for fuel consumption may alternatively increase responsive to the average vehicle speed exceeding the requested vehicle speed, and decrease responsive to the average vehicle speed lower than the requested vehicle speed. For example, the increase of $q_m$ may be proportional to the difference between the average vehicle speed and the requested vehicle speed. For another example, the adjustment of $q_m$ may be proportional to the rate of change in the average vehicle speed. By increasing the weight for fuel consumption, the penalty to the fuel consumption is increased, and penalty to the deviations of the instantaneous and average vehicle speed from the requested vehicle speed is decreased. Thus, the control generated by MPC may quickly correct the speed deviation.

In another embodiment, the weight for fuel consumption may be updated responsive to the change in vehicle mass. Vehicle mass affects the amount of fuel consumed to maintain the vehicle speed. The vehicle mass may increase due to increased loading or the addition of trailers. The increase in vehicle mass is equivalent to an inherent increase to the weight for fuel consumption, which may result in poorer tracking of the velocity set-point. Method 300 may update the weight of fuel consumption by multiplying a ratio between the past vehicle mass and the present vehicle mass (such as $$q_m \cdot \frac{M_{past}}{M_{present}},$$

wherein $M_{past}$ is the past vehicle mass, and $M_{present}$ is the present vehicle mass). As such, when the vehicle mass increases, for example, the weight for fuel consumption is decreased, and the MPC output may maintain the same velocity tracking performance as before.

In yet another embodiment, the weight for fuel consumption may be updated responsive to both the change in the vehicle average speed and the change in the vehicle mass. The weight $q_m$ may be updated based on both the vehicle average speed and the vehicle mass. For example, $q_m$ may be scaled by both the change in the average vehicle speed and a ratio between the past vehicle mass and the present vehicle mass.

At 324, method 300 measures current wheel torque $T_k$ and current engine speed $\omega_k$. In one example, the wheel torque and engine speed may be measured by corresponding sensors.

At 326, based on the current wheel torque and the current engine speed measured at 324, the wheel torque for the next time instant (i.e., future torque) is calculated by minimizing the objective function with the updated coefficients. For example, an optimal sequence of wheel torque $T_i$ in the prediction horizon is determined by minimizing the updated objective function. Similar to 312, the first element (i.e., wheel torque at the k+1 time instant) may be selected as the torque request and output from the MPC. The vehicle is then operated with the determined torque request. Then method 300 returns to 310 and determined the torque request based on the current objective function.

In this way, the objective function of the MPC is established not only limiting the deviation of the instantaneous vehicle speed from the requested speed, but also the average vehicle speed to the requested speed. Further, the coefficients of the objective function are updated in real-time during vehicle operation responsive to the change in the operating parameter. The coefficient update takes both the past and present operating parameter into account. As such, the global goal of the average vehicle speed being close to the requested speed may be achieved.

FIG. 4 is an example timeline showing variation of parameters while controlling a vehicle with MPC. The weight for the fuel consumption $q_m$ is updated online based on the average vehicle speed. The weight for speed deviations ($q_v$ and $q_{\bar{v}}$) are not updated. Graph 402 shows measured vehicle speed via a sensor. Graph 404 shows average vehicle speed calculated by taking the time average of the vehicle speed since the start of the cruise control. Graph 406 shows the weight for the fuel consumption $q_m$. Graph 408 shows the future torque generated by MPC. The future torque may be further used to adjust engine operation, such as the air/fuel ratio and air charge. The x-axes indicate time. The time increases as indicated by the arrow of x-axis. The value of the parameter increases as indicated by the arrow of the y-axis.

From T0 to T1, the vehicle is not in the cruise control mode. That is, the vehicle speed is not tracking a fixed speed, and is varied over the time period. In one example, the vehicle speed is controlled by the operator. The MPC may be turned off. As such, the average vehicle speed and $q_m$ is not calculated, and there is no MPC output.

At T1, the vehicle enters cruise control mode. The vehicle is operated to track the requested vehicle speed 410. Responsive to the transition from non-cruise control mode to the cruise control mode, the controller (such as controller 190 of FIG. 2) starts to calculate the average vehicle speed. Since the vehicle speed is constant from T0 to T1, the average vehicle speed remains unchanged at the same level as the requested speed 410. The objective function is established and coefficients of the objective function, including $q_m$, are initialized according to 308 of FIG. 3. The weight for the fuel consumption $q_m$ is not updated from T1 to T2. The MPC minimizes the objective function and outputs the future wheel torque. The vehicle is then operated based on the future wheel torque.

From T2 to T3, vehicle speed increases to a level higher than the requested vehicle speed 410, and the average vehicle speed also increases over the requested vehicle speed 410. Responsive to the change in average vehicle speed, $q_m$ of the objective function is updated based on the average vehicle speed. Since the average vehicle speed is increased, $q_m$ is also increased to a level higher than the level before T2. The increase of $q_m$ increases the penalty on fuel consumption. Thus, the MPC output calculated with the increased $q_m$ decreases. The vehicle is then operated based on a lowered future wheel torque.

At T3, the measured vehicle speed 402 decreases and starts to be less the requested vehicle speed 410. However, as the average vehicle speed 404 from the start of the MPC at T1 is still higher than the requested speed, the $q_m$ maintains at high level. From T3 to T4, as the measured vehicle speed 402 is lower than the requested vehicle speed 410, the average vehicle speed decreases. The weight $q_m$ decreases responsive to decreased average vehicle speed, and the MPC output increases.

From T4 to T5, responsive to the average vehicle speed 404 lower than the requested vehicle speed 410, $q_m$ is increased. Responsive to the increase in $q_m$, MPC output 408 decreases.

From T5 to T6, the average vehicle speed 402 is the same as the requested vehicle speed 410, and $q_m$ is kept at the constant level.

At T6, the vehicle exits the cruise control mode. The controller stops calculating the average vehicle speed, $q_m$, and the MPC output. In this way, during the cruise control mode from T1 to T6, the overall average speed is close to the requested vehicle speed.

FIG. 5 is another example timeline showing variation of parameters while controlling a vehicle with MPC. The weight for the fuel consumption $q_m$ is updated online based on the vehicle mass. The weight for speed deviations ($q_v$ and $q_{\bar{v}}$) are not updated. Graph 502 shows measured vehicle speed via a sensor. Graph 504 shows vehicle mass. The vehicle mass may be known, or may be estimated based on vehicle dynamics. Graph 506 shows the weight for the fuel consumption $q_m$. Graph 508 shows the future torque generated by MPC. The future torque may be further used to adjust engine operation, such as the air/fuel ratio and air charge. The x-axes indicate time. The time increases as indicated by the arrow of x-axis. The value of the parameter increases as indicated by the arrow of the y-axis.

From T10 to T11, the vehicle is not in the cruise control mode. The vehicle speed is not tracking a fixed speed, and is varied over the time period. In one example, the vehicle speed is controlled by the operator. The MPC is turned off. As such, the vehicle mass and $q_m$ is not calculated. There is no MPC output. The controller the controller (such as controller 190 of FIG. 2) may evaluate the vehicle mass according to method disclosed at 316 of FIG. 3.

At T11, the vehicle enters the cruise control mode. The vehicle is operated to track the requested vehicle speed 510. In one embodiment, the controller may start to evaluate the vehicle mass, responsive to transitioning from non-cruise control mode to the cruise control mode. The objective function is established and coefficients of the objective function, including $q_m$, are initialized according to 308 of FIG. 3. The weight for the fuel consumption $q_m$ is not updated from T11 to T12. The MPC output is constant.

At T12, the controller detects an increase in vehicle mass 504. The weight $q_m$ of the objective function is updated by multiplying the ratio between the past vehicle mass before T12 and the present vehicle mass after T12. As such, $q_m$ is decreased and the penalty on fuel consumption is decreased. The future torque output from MPC increases to maintain the vehicle speed 502 close to the requested vehicle speed 510.

At T13, responsive to the decrease in vehicle mass 504, $q_m$ is increased by multiplying the ratio between the past vehicle mass before T13 and the present vehicle mass after T13. The future torque output from MPC decreases, the vehicle speed 502 is maintained at the requested vehicle speed 510.

At T14, the vehicle exits the cruise control mode. The controller stops updating $q_m$ and the MPC output. In this way, during the cruise control mode from T11 to T14, the measured vehicle speed 502 is maintained at the same level as the requested vehicle speed 510.

In this way, both the instantaneous vehicle speed and the average vehicle speed during the cruise control mode may track the requested vehicle speed while controlling the vehicle torque output with MPC. Further, by updating the coefficient of the objective function online, the optimal control may be achieved with the MPC responsive to the change in operating parameters. The technical effect of including the deviation of the average speed from the requested speed in the objective function is that the global objective of speed tracking may be achieved. The technical effect of including history information in updating the objective function is that the overall performance of the MPC may be improved. For example, the stability and the recursive feasibility of the MPC may be guaranteed. Technical effect of updating the coefficient of the objective function based on the past and present operating parameter, and subsequently determining the future wheel torque by minimizing the objective function, is that the computation intensity be lowered compared to optimizing for the coefficient and the torque simultaneously.

As one embodiment, a method for an engine includes determining a future wheel torque of a vehicle, having a combustion engine providing torque to one or more vehicle wheels, by minimizing an objective function which includes each and every of a deviation of an instantaneous vehicle speed from a requested vehicle speed, a deviation of an average vehicle speed from the requested vehicle speed, and a fuel consumption. In a first example of the method, the objective function further includes a first weight for the deviation of the instantaneous vehicle speed form the requested vehicle speed, a second weight for the deviation of the average vehicle speed from the requested vehicle speed, and a third weight for the fuel consumption. A second example of the method optionally includes the first example and further includes updating one or more of the first weight, the second weight, and the third weight of the objective function during vehicle operation based on past and present operating parameters. A third example of the method optionally includes one or more of the first and second examples, and further includes wherein the past and present operating parameters include the average vehicle speed. A fourth example of the method optionally includes one or more of the first through third examples, and further includes updating the weight for fuel consumption based on the average vehicle speed. A fifth example of the method optionally includes one or more of the first through fourth examples, and further includes wherein the weight for fuel consumption is increased responsive to increase of the average vehicle speed. A sixth example of the method optionally includes one or more of the first through fifth examples, and further includes wherein the past and present operating parameters includes a past vehicle mass and a present vehicle mass. A seventh example of the method optionally includes one or more of the first through sixth examples, and further includes updating the weight for fuel consumption by multiplying a ratio between the past vehicle mass and the present vehicle mass.

As another embodiment, a method for an engine includes operating a vehicle in a cruise control mode, the vehicle having a combustion engine providing torque to one or more vehicle wheels; initializing an objective function, which includes each and every of a deviation of an instantaneous vehicle speed from a requested vehicle speed, a deviation of an average vehicle speed from the requested vehicle speed, and a fuel consumption; selecting a coefficient of the objective function to be updated; updating the coefficient based on past and present vehicle operating parameters; determining a future wheel torque by minimizing the objective function; and operating the vehicle to generate the determined future wheel torque. In a first example of the method, further comprises selecting the coefficient by analyzing a sensitivity of a value function with respect to the coefficient. A second example of the method optionally includes the first example and further includes selecting a second, different, coefficient of the objective function by analyzing the sensitivity of the value function with respect to the second parameter, updating the second parameter, and determining the wheel torque by minimizing the objective function with the updated second parameter. A third example of the method optionally includes one or more of the first and second examples, and further includes selecting the coefficient based on a vehicle operating condition. A fourth example of the method optionally includes one or more of the first through third examples, and further includes wherein the coefficient includes one or more of a weight for the deviation of the instantaneous vehicle speed form the requested vehicle speed, a weight for the deviation of the average vehicle speed from the requested vehicle speed, and the weight for fuel consumption. A fifth example of the method optionally includes one or more of the first through fourth examples, and further includes wherein the fuel consumption is calculated based on an instantaneous wheel torque and an engine speed. A sixth example of the method optionally includes one or more of the first through fifth examples, and further includes wherein the vehicle operating parameters include a vehicle speed and a vehicle weight. A seventh example of the method optionally includes one or more of the first through sixth examples, and further includes wherein the average vehicle speed is calculated by averaging the instantaneous vehicle speed from the start of the cruise control mode.

As yet another embodiment, a vehicle system, comprises a combustion engine coupled to one or more wheels of the vehicle; a speed sensor to measure a current vehicle speed; a torque sensor to measure a current wheel torque; and a controller with computer readable instructions stored in a non-transitory memory configured to: determine a future wheel torque by minimizing an objective function based on the current vehicle speed and the current wheel torque, the objective function includes each and every of a deviation of an instantaneous vehicle speed from a requested vehicle speed, a deviation of an average vehicle speed from the requested vehicle speed, and a fuel consumption; operate the vehicle to generate the determined future wheel torque; determine a change in a vehicle operating parameter; responsive to the change in the vehicle operating parameter, update a weight of the objective function based on the change of the vehicle operating parameter; update the future wheel torque by minimizing the objective function with the updated weight; and operate the vehicle to generate the updated future wheel torque. In a first example of the system, the controller is further configured to determine an air-fuel ratio of engine combustion gases and an air charge supplied to the engine, and operate the vehicle based on the air-fuel ratio and the air charge. A second example of the system optionally includes the first example and further includes wherein the controller is further configured to update the weight of the objective function based on a level of the vehicle operating parameter before and after the change. A third example of the method optionally includes one or more of the first and second examples, and further includes wherein the controller is further configured to update a second weight of the objective function responsive to a change of a second vehicle operating parameter, and update the future wheel torque by minimizing the objective function with the updated second weight.

In another presentation, a hybrid vehicle system comprises a speed sensor for measuring an instantaneous vehicle speed; a torque sensor for measuring a wheel torque; and a controller with computer readable instructions stored in a non-transitory memory configured for: determining a future wheel torque by minimizing an objective function, the objective function includes a deviation of an instantaneous vehicle speed form a requested vehicle speed, a deviation of an average vehicle speed from the requested vehicle speed, and a fuel consumption; operating the vehicle to generate the determined future wheel torque; determining a change in a vehicle operating parameter; responsive to the change in the vehicle operating parameter, updating a weight of the objective function based on the change of the vehicle operating parameter; updating the future wheel torque by minimizing the objective function with the updated weight; and operating the vehicle to generate the updated future wheel torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   determining a future wheel torque of a vehicle, having a combustion engine providing torque to one or more vehicle wheels, by minimizing an objective function which includes each and every of a deviation of an actual instantaneous vehicle speed from a requested vehicle speed, a deviation of an actual average vehicle speed from the requested vehicle speed, and an actual fuel consumption of the vehicle;
   wherein the objective function further includes a first weight for the deviation of the instantaneous vehicle speed form the requested vehicle speed, a second weight for the deviation of the average vehicle speed from the requested vehicle speed, and a third weight for the fuel consumption;
   updating one or more of the first weight, the second weight, and the third weight of the objective function during vehicle operation based on past and present operating parameters;
   wherein the past and present operating parameters includes a past vehicle mass and a present vehicle mass;
   further comprising updating a weight for fuel consumption by multiplying a ratio between the past vehicle mass and the present vehicle mass.

2. The method of claim 1, wherein the past and present operating parameters include an average vehicle speed.

3. The method of claim 2, further comprising updating the weight for fuel consumption based on the average vehicle speed.

4. The method of claim 3, wherein the weight for fuel consumption is increased responsive to increase of the average vehicle speed.

5. A method comprising:
   operating a vehicle in a cruise control mode, the vehicle having a combustion engine providing torque to one or more vehicle wheels;
   initializing an objective function, which includes each and every of a deviation of an instantaneous vehicle speed from a requested vehicle speed, a deviation of an average vehicle speed from the requested vehicle speed, and a fuel consumption;
   selecting a coefficient of the objective function to be updated;
   updating in real time the coefficient based on past and present vehicle operating parameters;
   determining a future wheel torque by minimizing the objective function;
   operating the vehicle to generate the determined future wheel torque; and
   selecting the coefficient by analyzing a sensitivity of a value function with respect to the coefficient.

6. The method of claim 5, further including selecting a second, different, coefficient of the objective function by analyzing the sensitivity of the value function with respect to the second parameter, updating the second parameter, and determining the wheel torque by minimizing the objective function with the updated second parameter.

7. The method of claim 5, further comprising selecting the coefficient based on a vehicle operating condition.

8. The method of claim 5, wherein the coefficient includes one or more of a weight for the deviation of the instantaneous vehicle speed form the requested vehicle speed, a weight for the deviation of the average vehicle speed from the requested vehicle speed, and the weight for fuel consumption.

9. The method of claim 5, wherein the fuel consumption is calculated based on an instantaneous wheel torque and an engine speed.

10. The method of claim 5, wherein the vehicle operating parameters include a vehicle speed and a vehicle weight.

11. The method of claim 5, wherein the average vehicle speed is calculated by averaging the instantaneous vehicle speed from a start of the cruise control mode.

12. A vehicle system, comprising:
- a combustion engine coupled to one or more wheels of the vehicle;
- a speed sensor to measure a current vehicle speed;
- a torque sensor to measure a current wheel torque; and
- a controller with computer readable instructions stored in a non-transitory memory configured to:
  - determine a future wheel torque by minimizing an objective function based on the current vehicle speed and the current wheel torque, the objective function includes each and every of a deviation of an actual instantaneous vehicle speed from a requested vehicle speed, an actual deviation of an average vehicle speed from the requested vehicle speed, and an actual fuel consumption;
  - operate the vehicle to generate the determined future wheel torque;
  - determine a change in a vehicle operating parameter;
  - responsive to the change in the vehicle operating parameter, update during operation a weight of the objective function based on the change of the vehicle operating parameter, wherein the past and present operating parameters includes a past vehicle mass and a present vehicle mass;
  - updating the weight of fuel consumption by multiplying a ratio between the past vehicle mass and the present vehicle mass;
  - update the future wheel torque by minimizing the objective function with the updated weight; and
  - operate the vehicle to generate the updated future wheel torque.

13. The vehicle system of claim 12, wherein the controller is further configured to determine an air-fuel ratio of engine combustion gases and an air charge supplied to the engine, and operate the vehicle based on the air-fuel ratio and the air charge.

14. The vehicle system of claim 12, wherein the controller is further configured to update the weight of the objective function based on a level of the vehicle operating parameter before and after the change.

15. The vehicle system of claim 12, wherein the controller is further configured to update a second weight of the objective function responsive to a change of a second vehicle operating parameter, and update the future wheel torque by minimizing the objective function with the updated second weight.

* * * * *